United States Patent [19]
Choi et al.

[11] Patent Number: 5,696,769
[45] Date of Patent: Dec. 9, 1997

[54] DECISION ERROR CORRECTING METHOD OF A DIGITAL COMMUNICATION SYSTEM AND THE DIGITAL COMMUNICATION SYSTEM FOR THE SAME

[75] Inventors: Seung-won Choi; Chan-bok Lee, both of Seoul, Rep. of Korea

[73] Assignee: LG Information & Communications, Ltd, Rep. of Korea

[21] Appl. No.: 389,116

[22] Filed: Feb. 15, 1995

[30] Foreign Application Priority Data

Nov. 8, 1994 [KR] Rep. of Korea .................. 94-29174

[51] Int. Cl.$^6$ ............................................. G06F 11/00
[52] U.S. Cl. .................. 371/30; 371/67.1; 371/25.1; 371/28
[58] Field of Search ............................................. 371/30

[56] References Cited

U.S. PATENT DOCUMENTS

| | | | |
|---|---|---|---|
| 4,742,533 | 5/1988 | Weidnere et al. | 375/85 |
| 4,821,268 | 4/1989 | Berlekamp | 371/37 |
| 4,827,489 | 5/1989 | Doi et al. | 375/341 |
| 5,127,025 | 6/1992 | Okanoue | 375/100 |
| 5,142,551 | 8/1992 | Borth et al. | 375/7 |
| 5,379,306 | 1/1995 | Noma et al. | 371/43 |
| 5,432,821 | 7/1995 | Polydoros et al. | 375/340 |
| 5,444,721 | 8/1995 | Okanoue et al. | 371/43 |

OTHER PUBLICATIONS

E. Dahlman and B. Gudmundson, Performance Improvement in Decision Feedback Equalisers by Using "Soft Decision." Electronic Letters, 18th Aug. 1988, vol. 24 No. 17 pp. 1084–1085, Aug. 1988.

P. K. Shukla and L. F. Truener, Examination of an Adaptive DFE and MLSE/near–MLSE for Fading Mutipath Radio Channels. IEE Proceedings–1, vol. 139, No. 4 pp. 418–428, Aug. 1992.

Kevin L. Baum,, David E. Borth, and Bruce D. Mueller, A Comparison of Nonlinear Equalization Methods for the U.S. Digital Cellular System. Supercomm/ICC '92: Discovering a New World of Communications, IEEE Publication CG3132-9/0000-0291, 1992.

Joseph C. S. Cheung and Raymond Steele, Soft–Decision Feedback Equalizer for Continuous Phase Modulated Signals in Wideband Mobile Radio Channels, IEEE Transactions on Communications, vol. 42, No. 2/3/4, pp. 1628–1638, Feb. 1994.

W. Zhuang, P. A. Goud, and W.A. Krzymien. Adaptive Soft–Decision Feedback Equalization for Indoor Radio Communications Using Trellis–Coded CPFSK, Vehicular Technology, 1994 Conference, IEEE Publication 0-7803-1927-3/94 pp. 1364–1368, Jun. 1994.

*Primary Examiner*—Tan V. Mai
*Assistant Examiner*—Yoncha Kundupoglu
*Attorney, Agent, or Firm*—Cooper & Dunham LLP

[57] ABSTRACT

A decision error correcting method that is adopted to a general digital communication system having a decision circuit finding an original message from a received signal to remove a misdecision-to-adjacent symbol. The decision error correcting method includes performing a soft decision for a received suspicious signal with all the candidate symbols, computing error distances between the suspicious signal and all the candidate symbols, computing respective error distances between each candidate symbol and following signals received immediately after the suspicious signal for a predetermined test period of time, adding the error distances for each candidate symbol, comparing sums of the error distances to select a least sum of the error distances, and selecting the candidate symbol and following symbols detected after the selected candidate symbol resulting in the least sum of the error distances as original message symbols corresponding to one suspicious signal and the following signals.

14 Claims, 7 Drawing Sheets

DECISION ERROR CORRECTING METHOD OF A DIGITAL COMMUNICATION SYSTEM AND THE DIGITAL COMMUNICATION SYSTEM FOR THE SAME

BACKGROUND OF THE INVENTION (1) Field of the Invention

The present invention relates to a general digital communication system. More particularly, it relates to a new soft decision scheme that ensures the removal of misdecision-to-adjacent symbol (MTAS) in the process of recovering from a received signal, corrupted by interferences and noises the originally sent signal.

(2) Description of the Prior Art

In the modern communication systems, messages to be transmitted are normally converted into a proper form, that is symbols, prior to transmission to enhance the system performance.

Due to the interferences and noises that are usually contained in the communication channel, the received signal at the receiving end often may be quite different from the originally sent signal. That is, when a transmitted original signal s(k) is received at a receiver via a transmission channel, the received signal may contain a noise signal z(k).

A received signal x(k) via a multipath fading channel is expressed as follows:

$$x(k) = \sum_n a_{n,k} s(k-n) + z(k) \quad (1)$$

where "k" is a time index, "n" is a path index and "$a_{n,k}$" is the impulse response of the nth path at the kth symbol.

It is generally impossible to recover the original symbols from the received signal unless a proper compensation is made at the receiver.

An equalizer is a digital filter that extracts the original message data from corrupted signals by deconvolving the received data in the signal.

An output y(k) of the digital filter is expressed as follows at each sample period k of the data sequences:

$$\sum_j w_j x(k-j) = y(k) \quad (2)$$

where $w_j$ is a tap coefficient for tap "j" of the equalizer multiplied by a plurality of delayed received signals.

The equalizer, a kind of digital filter, may find the optimum tap coefficients based on selection of the minimum of $|\hat{y}(k)-y(k)|^2$, by means of an adaptive algorithm, where $\hat{y}(k)$ is a decision symbol for y(k).

Coefficients $w_j$, where j is $-N_2, -N_2+1, \ldots, -1, 0, 1, 2, 3, \ldots, N_1$ with $N_1$ and $N_2$ being the number of taps in feedbackward and feedforward part, respectively, are updated at each sampling period by an algorithm so that a square error can be minimized.

This square error is a decision error e(k) and is computed as a distance between a received signal and the original message symbol $\hat{y}(k)$ located closest to the detected signal in signal space.

That is, the decision error e(k) is found from the following expression:

$$e(k) = \hat{y}(k) - y(k) \quad (3)$$

Since the message symbols of the original signal s(k) are perceived by the receiver during a training period for perception, the decision error e(k) is computed as:

$$e(k) = s(k) - y(k) \quad (4)$$

If the communication channel is a time varying channel; as symbols are transmitted in frame units, the symbols shift toward the rear of the frame units. This shift causes the tap coefficients of the receiver (weight values) to be less accurate.

Also, error symbols occurring in the initial frame units cause the tap coefficients of the receiver to become even more inaccurate, and the performance of the subsequent frame units may be degraded. In addition, error symbols in initial frame units usually occur in boundary regions between adjacent symbols.

When the digital communication system includes a decision procedure for recovering the original message by measuring the error to adjacent symbols most of the communication errors result from the wrong decisions in selecting from the adjacent symbols.

Figure 1:
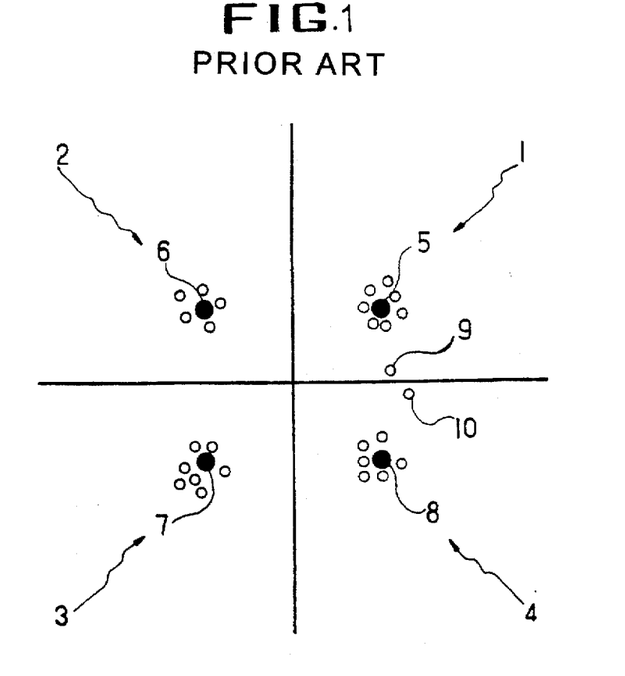
FIG. 1 is a constellation of quadrature phase shift keying (QPSK) signal for explaining an original message decision technique as to received signals in a conventional QPSK method.

FIG. 1 depicts a constellation of a quadrature phase shift keying (QPSK) signal. The plane on which the constellation is drawn is referred to as a signal space. Reference numerals 1, 2, 3 and 4 represent respectively the regions of first, second, third and fourth quadrants of the signal space. Dots 5, 6, 7 and 8 are the possible original message symbols and are selected to encode the data to be sent. The small circles at each quadrant represent received signals. For each such received signal, a decision to be made to find which one of the four message symbols 5, 6, 7, and 8 of the original message is represented by that received signal.

Out of many received signals, signals 9 and 10 located in the boundary region are particularly labeled because they are discussed in the detailed description of the present invention.

According to a prior art decision method, since the received signal 9 is closer to the message symbol 5 than the other message symbols 6, 7, and 8, the received signal 9 is determined to be message symbol 5, and the received signal 10 is determined to be message symbol 8 in the same way.

In general, when a communication is performed with a reasonable reliability, or when the signal environment surrounding the communication system is not too adverse, a wrong decision happens due to a small error rather than an absurdly large one. Therefore, the MTAS which is the main reason for error in the communication in most practical situations, happens because of received signals in boundary regions between adjacent symbols.

In coping with the erroneous decision, there are two fundamental requirements, which were not satisfied simultaneously in the conventional technique. One requirement is not to require too much additional complexity in both hardware and software of the system. The other requirement is that, the detection itself must be reliable. For the detection to be accurate, the system must check all the possibilities, which can cause unrealistic complexities. As mentioned above, it may be appreciated that a need has arisen to improve the performance of the system by correcting the MTAS with a reasonable reliability and complexity.

SUMMARY OF THE INVENTION

It is a first object of the present invention to provide a decision error correcting method that is adopted to a general digital communication system having a decision circuit finding an original message symbol from a received signal thereby removing a misdecision-to-adjacent symbol MTAS.

It is a second object of the present invention to provide a digital communication system that can remove the MTAS by the decision error correcting method.

In order to achieve the first object, the present invention provides a decision error correcting method of a digital communication system, comprising the steps of:

performing a soft decision for a received suspicious signal with all the candidate symbols;

computing error distances between the suspicious signal and all the candidate symbols;

computing respective error distances between each candidate symbol and following signals received immediately after the suspicious signal for a predetermined test period of time;

adding the error distances for each candidate symbol;

comparing sums of the error distances to select a least sum of the error distances; and selecting the candidate symbol and following symbols detected after the selected candidate symbol resulting in the least sum of the error distances as original message symbols corresponding to one suspicious Signal and the following signals.

The inventive digital communication system comprises:

a receiver for reproducing an original signal from a received input signal;

decision means for deciding an output signal from said received signal and producing error distances and decision output signals;

buffer means for storing the decision output signals produced from the decision means during a test period, the buffer means comprising a plurality of buffers;

error distance sum computing means for adding each error distance during the test period and producing a selection signal to select one buffer resulting in the least sum of error distances; and controlling means for controlling error distance values obtained from the decision means so as to be applied to the error distance sum computing means and the receiver in the test period when the output signal of the receiver is suspicious;

wherein a series of output signals produced from the selected buffer by the selection signal are determined as original message symbols for the signals involved in the test period.

According to the decision procedure based on the conventional principle of the least distance selection, most erroneous decisions are normally associated with selecting adjacent symbols to the original message symbol in signal space because the adjacent symbol is closest to the received signal rather than the original message symbol located further away.

Although it is quite easy to notice that many communications errors are caused by the MTAS, it is not a simple task to detect the MTAS errors not only because it would be too complicated and costly to check all the possibilities of adjacent symbols for every received signal but also because there is basically no way to find which of the adjacent symbols is really the original message symbol.

In more practical situations, when communication is performed with a reasonable reliability, or when the signal environment surrounding the communication system is not too adverse, MTAS is the main reason for communication error. Such error can be prevented by further analyzing the signals in the boundary regions only.

Any received signal can be refined by the procedure presented in the invention whenever the received signal is suspicious. The location and area of the suspicious region should be determined carefully in such a way that the improvement of system performance is maximized, and at the same time, any additional complexity does not exceed that allowed to a given system.

If the suspicious region in a QPSK signal reception is set as the boundary regions between each quadrant, whenever a signal is received in any one of these four regions the present invention does not exclude the possibility that the observed signal might not represent the symbol closest to it but instead may represent one of the other symbols nearby.

The actual location and area of suspicious region, however, depends on how much improvement of system performance is desired, how much redundancy is allowed to execute the additional computation, what kind of technologies have been adopted to the system etcetera. The larger the size of the suspicious region becomes, the more samples should be checked and, consequently, more computations are required.

According to the present invention, when a received signal is determined to be in a suspicious region, the decision for the received signal is deferred. In addition, the adjacent symbol(s) as well as the symbol closest to the received signal are considered for the decision. These adjacent symbol(s) and closest symbols under consideration, are candidate symbols for being the correct symbol.

If the received signal is determined to be in a suspicious region, the decision is deferred, and the soft decision procedure is continued simultaneously for each candidate symbol for a predetermined period of time.

In order to select one symbol among the candidates, the present invention sums the error distances for each candidate and at least two received signals. In other words, the error distance between the received signal and each candidate symbol is added up for at least two sample periods, that is, for at least two received signals. The error distance for the received signal is defined as the distance between the received signal and message symbol closest to the signal in the signal space.

The candidate symbol and the following regularly determined symbols resulting in the lowest sum of error distances for the predetermined period of time are selected as being the correct original message symbols for the test period. Therefore, decisions for the suspicious signal and following received signals are made as soon as the candidate symbol representing the least sum of error distances is determined.

The length of the time period during which the decision is deferred is determined by the predetermined number of received signals following the suspicious signal, for each of which the magnitude of the decision error is computed and added up. The decision is held back until the sum of decision error distances for each candidate symbol has been compared and the correct original message symbol has been selected.

DETAILED DESCRIPTION OF THE PREFERRED EMBODIMENTS

Preferred embodiments of the present invention are described hereinafter with reference to the drawings.

Figure 2:
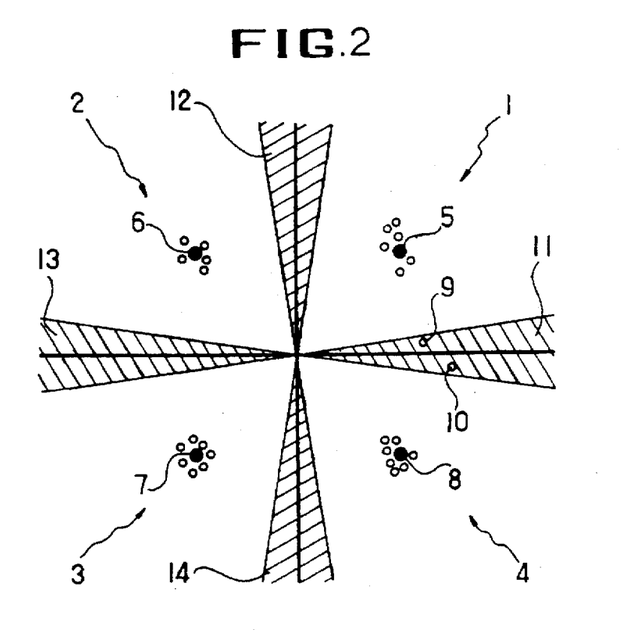
FIG. 2 is a constellation of quadrature phase shift keying (QPSK) signal for explaining an original message decision technique as to received signals in a QPSK method in accordance with the present invention.

FIG. 2 depicts four suspicious regions that have been set for the QPSK signals considered in FIG. 1. Reference numerals 5 to 8 designate message symbols. Suspicious regions 11, 12, 13 and 14 are set as boundary regions among four quadrants of the signal space 1, 2, 3 and 4. Received signals 9 and 10 are involved in the suspicious region 11.

The received signals 9 and 10 are suspicious because these signals are detected in the boundary area. Therefore, signals 9 and 10 are suspicious signals which means that the message symbol for the received signals 9 and 10 might not be message symbol 5 and 8, respectively.

Figure 3:
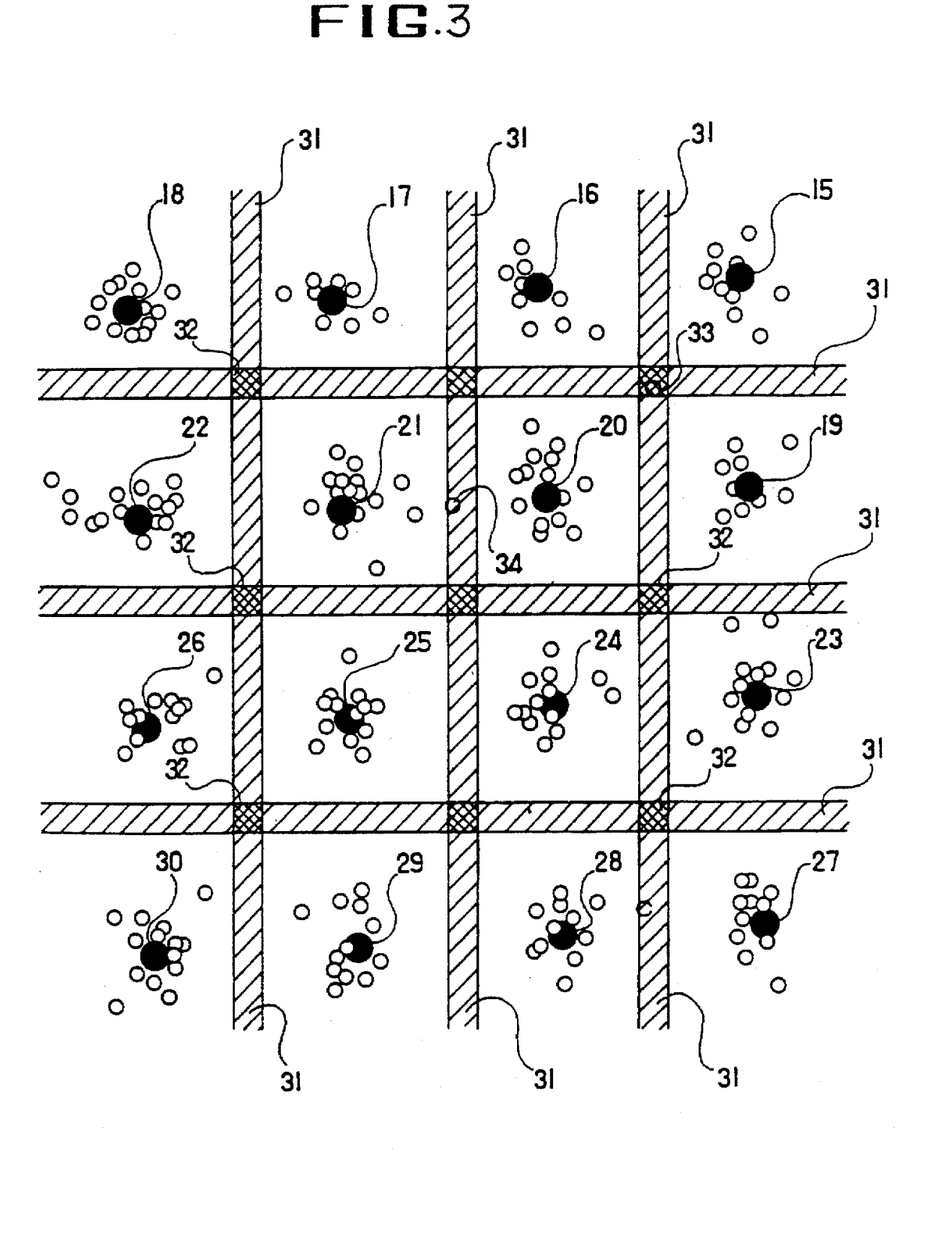
FIG. 3 is a constellation of 16 quadrature amplitude modulation (QAM) for explaining an original message decision technique as to received signals in a 16 QAM method in accordance with the present invention.

FIG. 3 depicts a constellation including boundary regions to adopt the inventive decision error correcting technique to a 16 quadrature amplitude modulation technique. Reference numerals 15 to 30 in FIG. 3 designate message symbols, 31 is a boundary region that is associated with 2 candidate symbols, 32 is a boundary region that is associated with 4 candidate symbols, and 33 and 34 are suspicious signals located in boundary regions.

If a signal is received in the boundary region 31 (or 32), two (or four) adjacent symbols should be taken into consideration as candidates.

A candidate symbol for the suspicious signal 33 is set as four message symbols 15, 16, 19 and 20 adjacent to the suspicious signal 33, and a candidate symbol for the suspicious signal 34 is set as two message symbols 20 and 21 adjacent to the suspicious signal 34.

Figure 4:
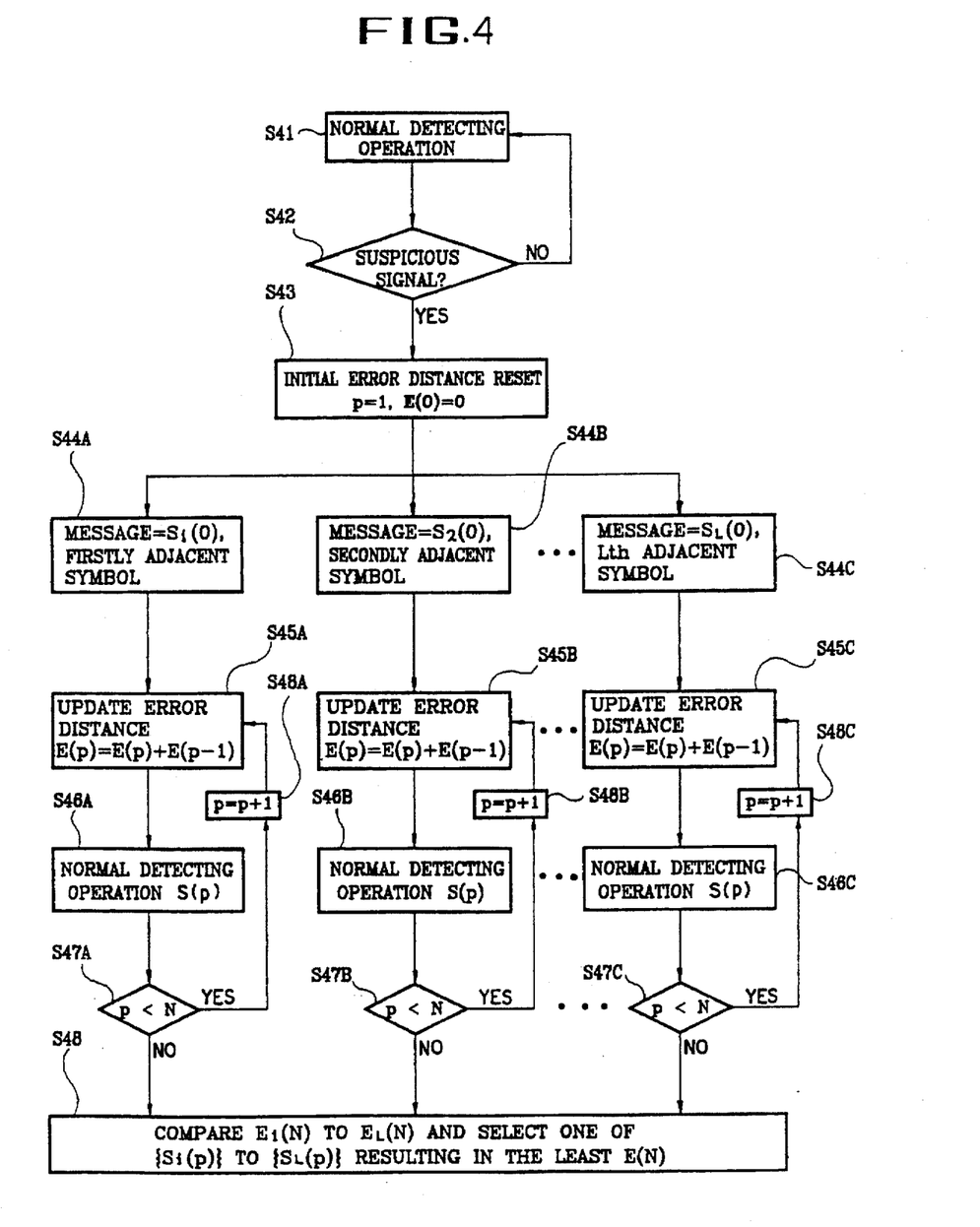
FIG. 4 is a flow chart for finding an original message symbol for a suspicious signal in accordance with the present invention.

FIG. 4 illustrates the flow chart for finding an original message symbol for a suspicious signal based on a soft decision in accordance with the present invention.

Referring to FIG. 4, a normal detecting operation is performed at S41. S42 determines if a received signal is located in a suspicious region. If the received signal is located in any one of the suspicious regions, the decision as to the received signal is deferred and the initial error distance E(0) is set to be zero and the number of the test samples p is set to be 1 at S43.

The number of candidate symbols L that is defined as an adjacent symbol corresponding to a suspicious signal and as a symbol closest to the signal, is determined according to the location of the received signal (two symbols in phase shift keying generally and a maximum of four symbols in QAM). The symbol for the suspicious signal is decided from a plurality of candidates symbols $\{S_1(0), S_2(0), \ldots, S_L(0)\}$ at S44A to S44C.

The error distance E(p) for each of them is found according to equation (3), and is added to an initial error distance E(0) at S45A to S45C.

Subsequently, the normal soft decision for the next received signal is performed to find an error distance at S46A to S46C. Whether the number of the test samples p is smaller than the predetermined sampling periods N (N is not less than two) is determined at S47A to S47C. If it is smaller, the number of the test samples p is increased by 1 at S48A to S48C, and the error distance E(p) that was found in the above steps at S46A to S46C is added to the sum of error distances E(p−1).

When the number of the test samples p is the same as the predetermined sampling periods N by the repeat of this operation, i.e. the error distance E(p) is added during the N sampling periods, each sum E(N) of the error distance found as to each candidate symbol is compared to each other, and the candidate symbol and the following symbols $\{S_1(p)\}$, $\{S_2(p)\}, \ldots, \{S_L(p)\}$ for p=0, 1, 2, ..., N resulting in the least sum of error distances are selected as accurate original message symbols (S48).

The process for finding an original message symbol of this invention is now described with reference to FIG. 2 and received signal 9.

Because received signal 9 is suspicious, i.e. the transmitted original message symbol corresponding to suspicious signal 9 is in the boundary region and thus may not be symbol 5, the original message symbol is more likely symbol 8 rather than symbol 6 or 7.

Thus, symbols 5 and 8 are selected as the candidate symbol as to the received signal 9 in FIG. 2. Each error distance computed from the two candidate symbols 5 and 8 with respect to the two received signal sets following the two candidate symbols are added up independently during at least two sample periods. Thereafter, the sum of error distances from the symbol 5 is compared to the sum of error distances from the symbol 8, and one set of the symbols resulting in the lowest sum of error distances is selected as the original message symbols.

When a signal is received in a suspicious region, subsequent decisions are deferred until the comparison of the sums of error distance is completed. Such decisions for the received signals involved in a procedure of the present invention are provided once the candidate resulting in the least sum is found.

The following description is about the digital communication system designed to find an original message in accordance with the soft decision procedure of the present invention.

Figure 5:
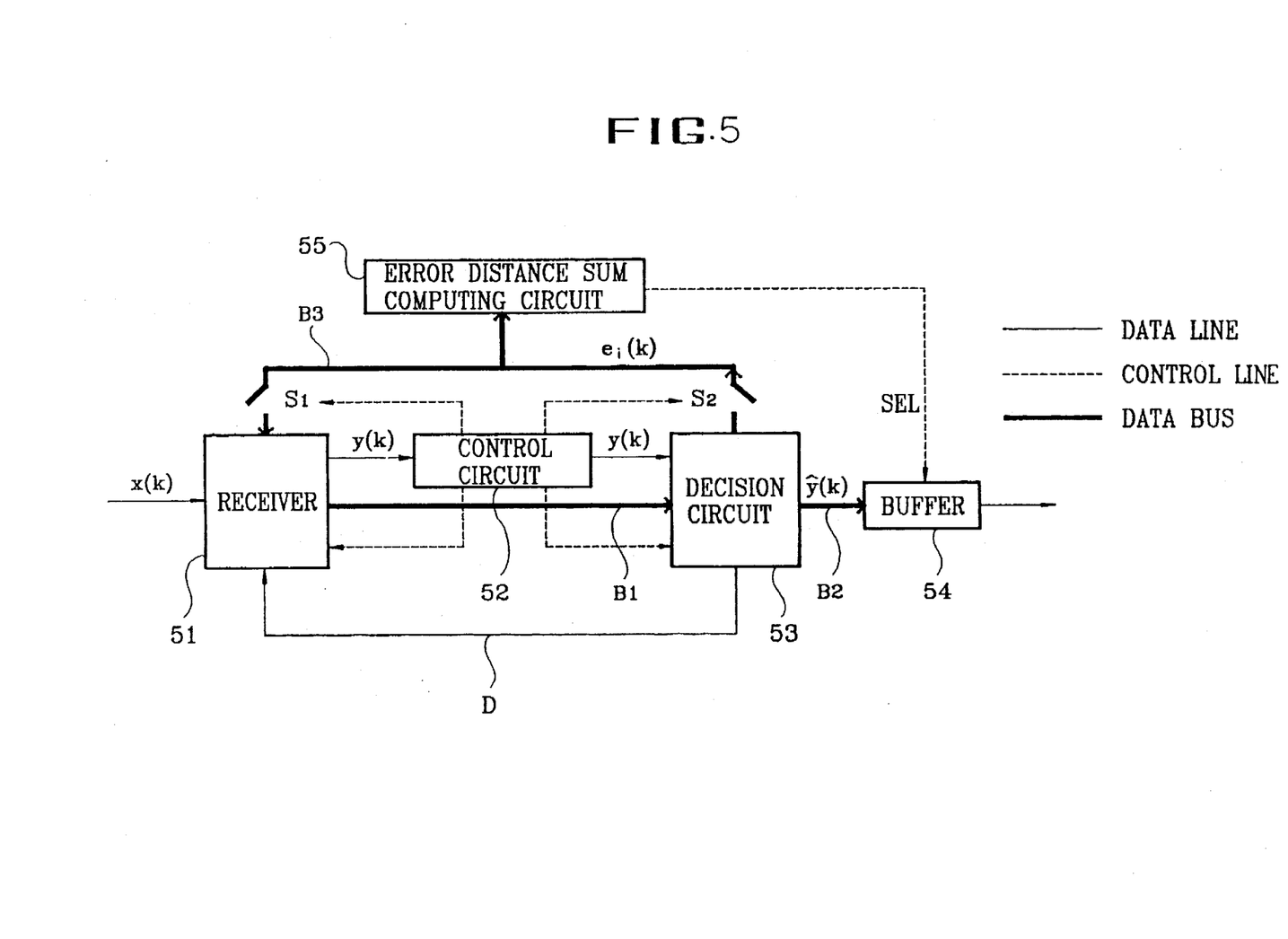
FIG. 5 is a schematic block diagram of a digital communication system in accordance with the present invention.

FIG. 5 is a schematic block diagram of a digital communication system in accordance with the present invention. Reference numerals designate the following: a receiver 51; a control circuit 52; a decision circuit 53; a buffer 54; an error distance sum computing circuit 55; switches $S_1$ and $S_2$.

The receiver 51 is a common receiving device for reproducing an original signal from an input signal x(k) and may be formed from an equalizer that is modified so that the inventive technique may be applied to it. The decision circuit 53 receives the received signal output from the receiver 51 and computes an error distance value e(k) and a decision value ŷ(k).

The error distance sum computing circuit 55 adds each error distance during the test period and produces a selection signal SEL to select the output signal line having the least sum of error distances. The buffer 54 is formed of L buffers, stores L sets of the symbols being determined during a test period, and outputs a corresponding output signal that is selected by the selection signal SEL of the error distance sum computing circuit 55.

In FIG. 5, the thin solid line, thick solid line and dotted line are the data line, data bus and control line, respectively.

The data bus comprises L data lines where L is a number of candidates, for example, L is 2 for the QPSK method and L is 4 or less for QAM method. The control circuit 52 tests if an output signal of the receiver 51 is reliable or not, and controls the receiver 51 and decision circuit 53 according to its result. For example, in the QPSK method, the phase of the output signal from the receiver 51 is checked to determine whether it lies in a boundary region, and in the QAM method, the magnitude and phase of the output signal of the receiver are checked to determine the reliability of the output signal.

The following description is about the case when an output signal of the receiver: (A) is not, or (B) is, located in a boundary region.

A. When the output signal of the receiver is not located in a boundary region and is reliable.

This is a case in which a symbol closest to the output signal y(k) of the receiver 51 is simply decided to be an original message symbol. At this point, the switches $S_1$ and $S_2$ are cut off, and the buffer 54 and error distance sum computing part 55 are not activated.

The decision circuit 53 computes an error distance as shown in equation (3) and the error distance is input through a data line D to the receiver 51 to renew the tap coefficient of the receiver. Accordingly, the receiver 51 in this case is operated equally to the common receiver.

B. When the output signal of the receiver is located in a boundary region and is suspicious.

The decision circuit 53 computes error values under consideration of all the candidate symbols for the output y(k) of the receiver 51, and then computes error distances as shown in equation (3). Since the switches $S_1$ and $S_2$ are all connected by the control circuit 52, the errors $e_i(k)$, i=1,2, ..., L, computed in the decision circuit 53 are output to the receiver 51 through data bus $B_3$ connected by the switches S2 and S1. As a result, the tap coefficients of the receiver 51 are updated and error distances computed in the decision circuit 53 are fed back to the error distance sum computing circuit 55.

Output signals of the receiver 51 computed from each candidate symbol under consideration are output to the decision circuit 53 via data bus B1. The decision circuit 53 determines decision values ŷ(k) corresponding to each output value of the receiver 51, and then outputs the values ŷ(k) to the buffer 54 through data bus $B_2$.

The decision circuit 53 then computes error distances corresponding to each output value and errors $e_i(k)$, and the errors are output to the receiver 51 through data bus B3 to update respectively tap coefficients of the receiver. The error distances are again fed back to the error distance sum computing circuit 55 and are added to the previous sums of error distances for each candidate symbol.

This operation is repeatedly performed during the test period, and decisions as to a suspicious signal and the following received signals are deferred during the test period. The error distance sum computing circuit 55 adds each error distance during the test period, compares each sum for each candidate symbol and finally detects the least sum of error distances. When the test period is over, the error distance sum computing circuit 55 procures a selection signal SEL for selecting an output signal line corresponding to the least sum of error distances among the multiple output values ŷ(k) stored in the L buffers. Therefore, the candidate symbol and the following symbols from the selected buffer are output as original message symbols.

Figure 6:
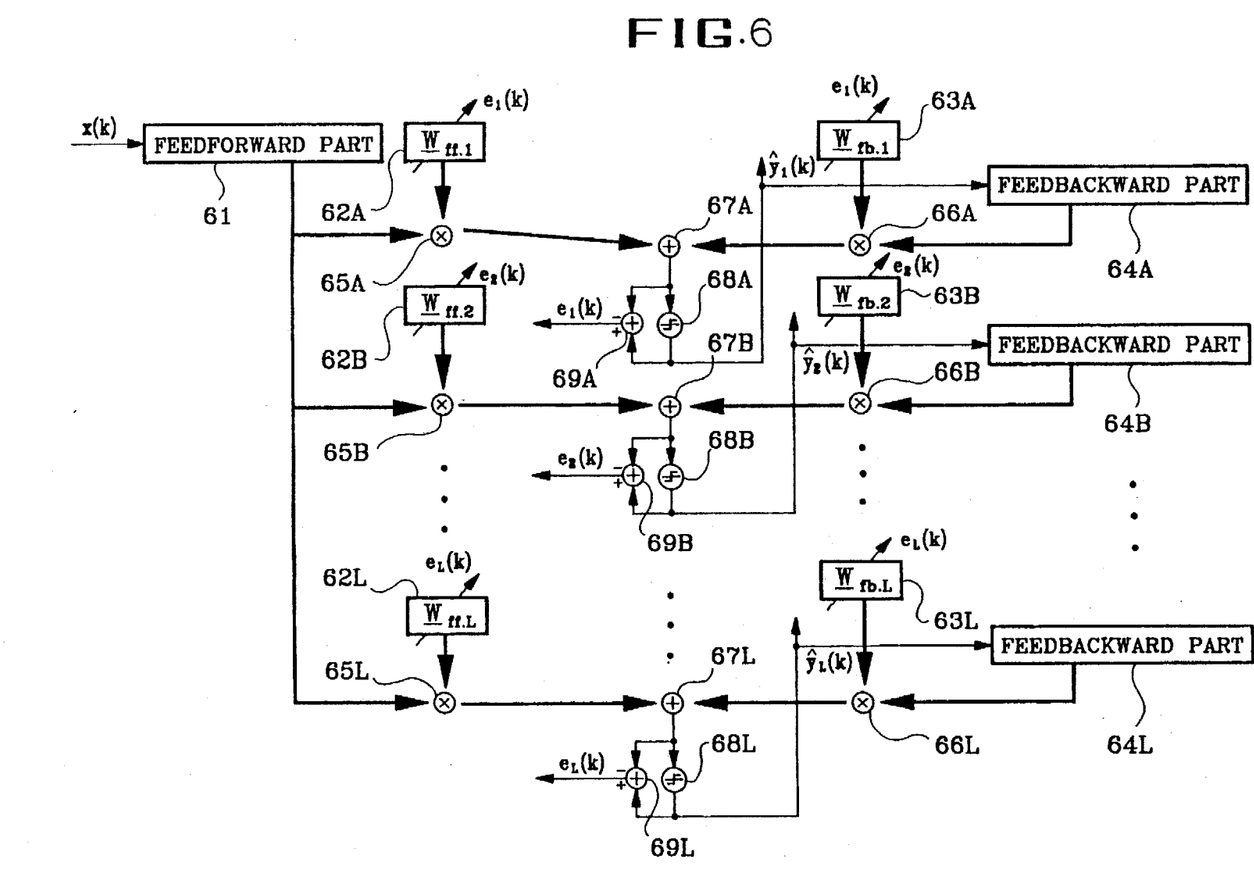
FIG. 6 is a detailed circuit diagram of a decision feedback equalizer (DFE) in accordance with the present invention.

FIG. 6 is a first preferred embodiment of the receiver and the decision circuit in FIG. 5, and shows the construction adopting a decision feedback equalizer (DFE).

The inventive DFE includes a feedforward part 61 to which a received signal x(k) is input; L feedforward tap coefficient generating parts 62A to 62L and L feedbackward tap coefficient generating parts 63A to 63L in which renewal of tap coefficients is made by independent errors $e_i(k)$, where i is 1, 2, ..., L, during a test period to output feedforward and feedbackward tap coefficient vector values $W_{ff}$ and $W_{fb}$; L feedbackward parts 64A to 64L having front ends to which decision values ŷ$_i$(k), where i is 1, 2, ..., L, are input; L multipliers 65A to 65L for generating inner products of output vector values of the feedforward part 61 and feedforward tap coefficient factor values $W_{ff}$, respectively; L multipliers 66A to 66L for generating inner products of vector values of the feedbackward part 64A to 64L and feedbackward tap coefficient vector values $W_{fb}$; L adders 67A to 67L for adding respectively outputs of the multipliers 65A to 65L and 66A to 66L; L deciding devices 68A to 68L for deciding outputs of each adder; and L subtractors 69A to 69L for generating errors $e_i(k)$ i=1, ..., L.

In FIG. 6 a solid line is a data line through which one bit data is transmitted and a thick solid line is a data line through which a plurality of bit data are transmitted. L is the number of candidate symbols for a suspicious signal, and in case of phase shift keying PSK, L is two. In case of quadrature amplitude modulation QAM, L can be up to four.

In the operation of the first preferred embodiment, received signals x(k) are input to the feedforward part 61 of the DFE, and output values ŷ(k) of the equalizer and values updated as errors e(k) computed from all the L candidate symbols are input to the tap coefficient generating parts 62 and 63 at the start stage of the test period.

Tap coefficients computed according to the difference between the output values y(k) and decision values ŷ(k) in each system are respectively set during the test period.

L decision values ŷ(k) for suspicious signals are input to the L feedbackward part 64, and decision values of the corresponding output values of the equalizer are input to the L feedbackward part 64 during the test period.

When the received signal is located in a suspicious region, inner products of the vector values of the feedforward part 61 and L feedforward tap coefficient vector values, and inner products of the vector values of the L feedbackward part 64 and L feedbackward tap coefficient vector values are found respectively by the multipliers 65A to 65L and 66A to 66L.

After that, the inner products are added up respectively to find outputs of the equalizer {y$_1$(k), y$_2$(k), ..., y$_L$(k)}. Error values {e$_1$(k), e$_2$(k), ..., e$_2$(k)} are found by a difference between these outputs and decision values found through each deciding device 68A to 68L, and each tap coefficient vector value $W_{ff}$ and $W_{fb}$ is updated by these error values.

The decision values corresponding to the outputs of the equalizer are respectively supplied to the front ends of the L feedbackward parts 64.

Figure 7:
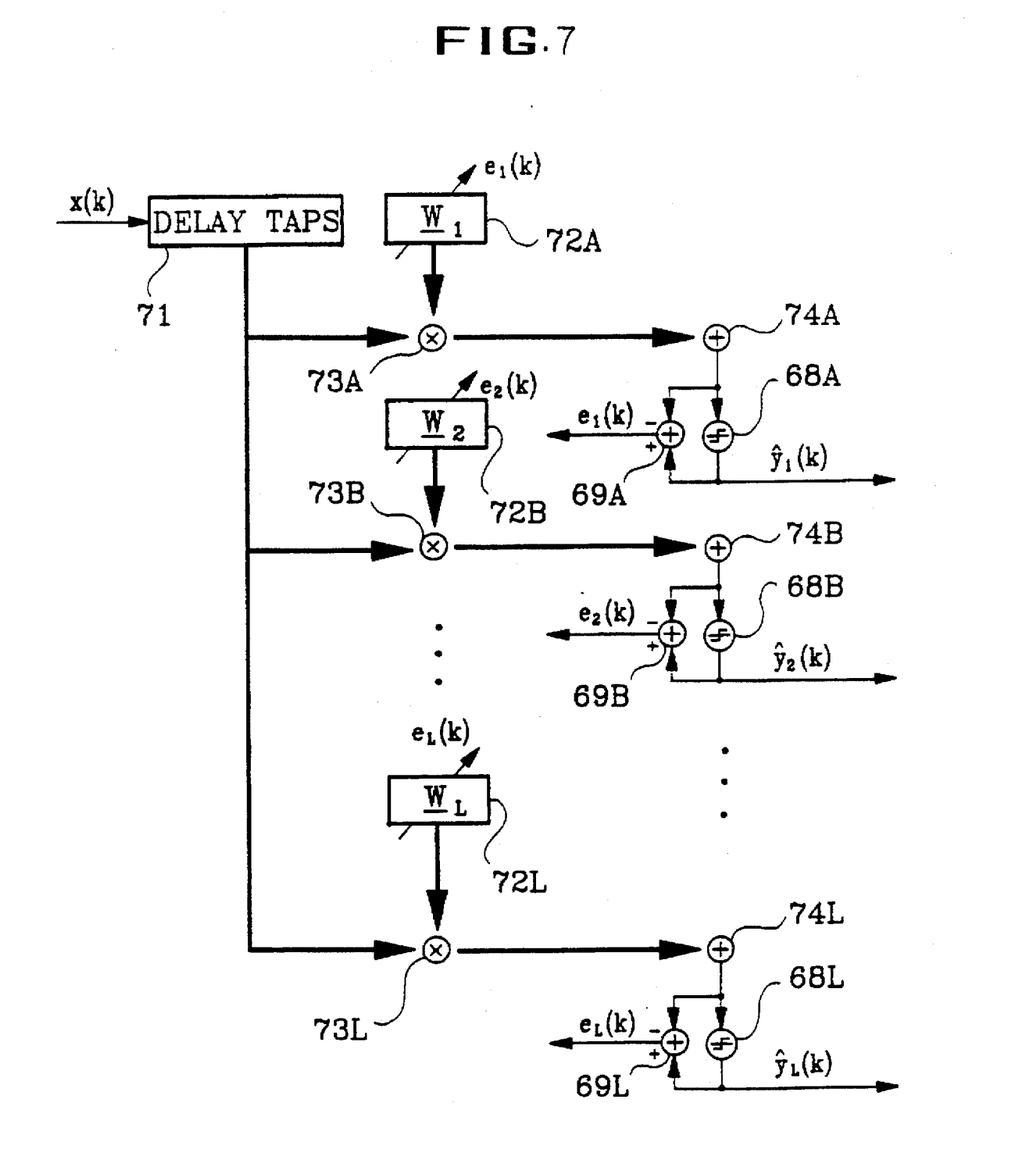
FIG. 7 is a detailed circuit diagram of a linear transversal equalizer (LTE) in accordance with the present invention.

FIG. 7 is a detailed circuit diagram of a linear transversal equalizer LTE, a second preferred embodiment of the receiver and the decision circuit in FIG. 5.

The LTE of the second preferred embodiment includes one set of delay taps 71 to which received signals x(k) are inputted; L delay tap coefficient generating parts 72A to 72L for renewing the tap coefficients with independent error values $e_i(k)$, where i is 1, 2, ..., L, during the test period and for generating delay tap coefficients; L multipliers 73A to 73L for generating inner products of output vector values of the delay tap and tap coefficient vectors; L adders 74A to 74L to add outputs of the multipliers 73A to 73L; L deciding devices 68A to 68L for determining output of each adder;

and L subtractors for 69A to 69L for generating a difference between outputs of the equalizer and the decision values as error values $e_i(k)$.

A solid line in FIG. 7 designates a data line through which one bit data is transmitted, and a thick solid line is a data line through which multiple bit data is transmitted.

Moreover, L designates the number of candidate symbols, and in case of PSK, L is two and in case of QAM, L can be a maximum of 4.

Outputs $y(k)$ of the equalizer from each system and values updated as errors of L, $e(k)$ computed from all the candidate symbols of L are input to the tap coefficient generating parts 72 during the test period.

In LTE, inner products of delay tap vector values and of tap coefficient vector values are found by the multiplier 73, and each of them are added by the adder 74 to find output $\{y_1(k), y_2(k), \ldots, y_L(k)\}$ of the equalizer. Tap coefficients of the tap coefficient generating parts 72 are updated with error values $\{e_1(k), e_2(k), \ldots, e_L(k)\}$ determined by differences between these outputs and decision values determined through the deciding devices 68.

Figure 8:
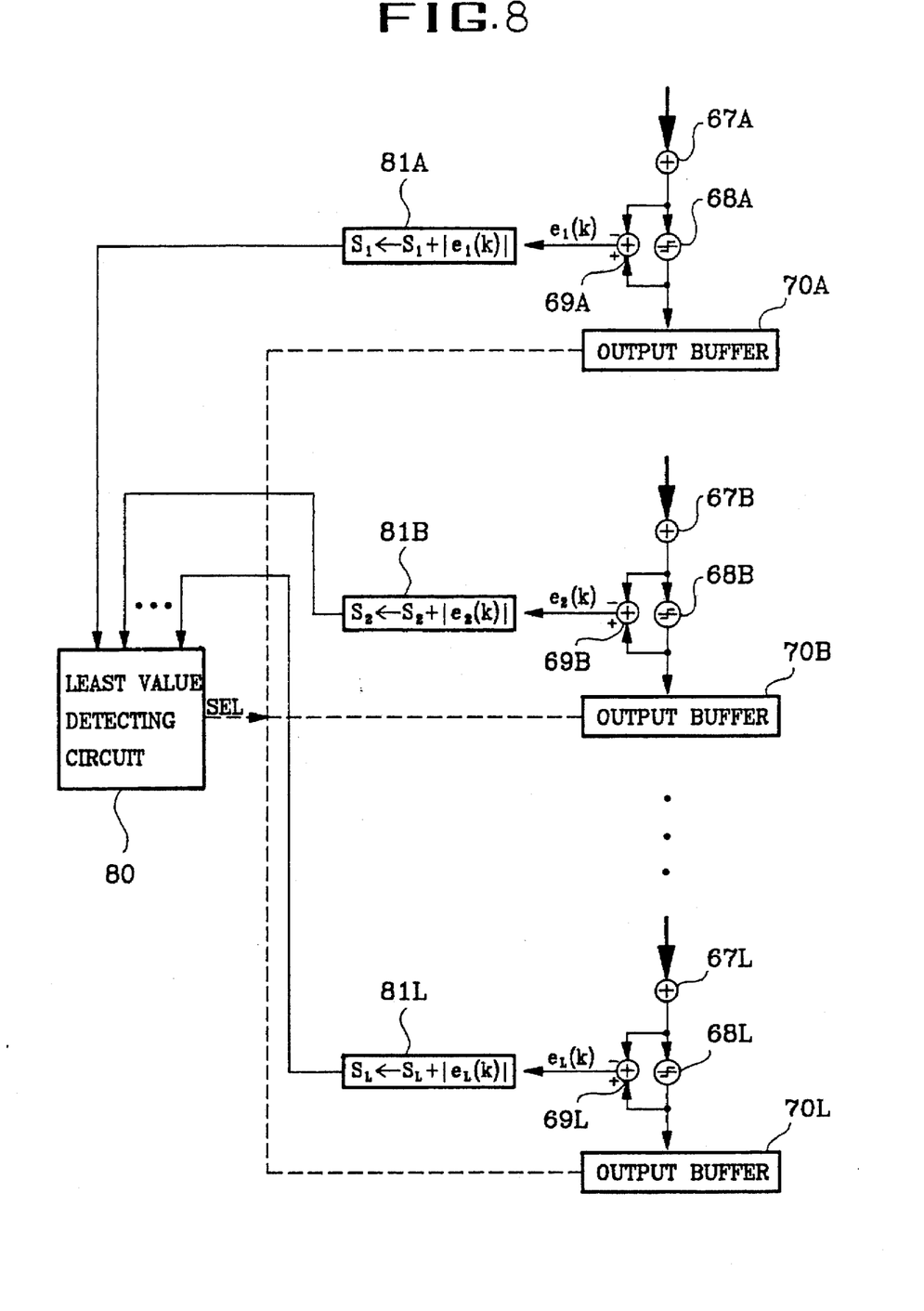
FIG. 8 is a detailed circuit diagram of an error distance sum computing circuit in accordance with the present invention.

FIG. 8 shows an example of the error distance sum computing circuit to find the least sum of error distances according to the present invention.

The decision values $\{\hat{y}_1(k)\}, \{\hat{y}_2(k)\}, \ldots, \{\hat{y}_L(k)\}$ that are found from the deciding devices 68A to 68L during the test period are respectively sorted in the output buffers 70A to 70L, and difference values between decision values and outputs of the adders 67A to 67L are accumulated and added as error distance values by accumulators 81A to 81L.

Outputs S1, S2, ..., SL of the accumulators 81A to 81L are compared to each other in a least value detecting circuit 80 at the end of the test period, and one output of the accumulators indicating the least sum of error distances forms a selection signal SEL to select one of the buffers 70A to 70L corresponding to the least sum of the accumulators. The output of the selected buffer is decided to be the original message symbols of the suspicious signal and following received signals involved in the test period.

The preferred embodiment is described, exemplifying the QPSK signal but this invention is not limited thereto and may be applied to all the digital communication systems such as general PSK, QAM, etc.

The error distance mentioned above is defined as the distance between the received signal and the message symbol, but the error distance according to the present invention may be defined as the distance between the received signal and the circumference of a circle of which the center is at the origin of the signal space and its radius is determined by the average power of the symbols.

In the former case, errors supplied with input to the receiver are equal to error distances supplied from the error sum computing circuit, but in the latter case, the errors are not equal to the error distances.

According to the present invention, the bit error rate of the system is reduced by 10 times compared to the conventional one, and there is improvement in the communication quality of the digital communication system in various adverse signal environments such as wide-band digital mobile communication etc.

What is claimed is:

1. A soft decision method for a QPSK digital communication system, comprising the steps of:

designating a received signal as a suspicious signal if said received signal is located in a boundary area of a signal space;

computing a respective error distance between said suspicious signal and each of two or more candidate symbols;

computing two sets of tap weight coefficients based on said respective error distances;

computing a respective error distance between each candidate symbol and each of a predetermined number of immediately following received signals, and computing for each of said candidate symbols, following symbols corresponding to said following received signals;

accumulating the respective error distances for each candidate symbol independently to determine a respective error distance sum;

comparing said error distance sums to select a least error distance sum; and selecting one of said candidate symbols and respective following symbols having said least error distance sum as original message symbols corresponding to said suspicious signal and said following received signals.

2. The method according to claim 1, wherein each of said error distances is a distance in signal space between one of said received signals and one of said candidate symbols.

3. The method according to claim 1, wherein each of said candidate symbols is selected from the group consisting of closest and adjacent symbols to said suspicious signal in said signal space.

4. The method according to claim 1, wherein each of said error distances is a distance between said received signal and a circumference of a circle having a center at an origin of said signal space and a radius in said signal space corresponding to the average power of the symbols.

5. The method according to claim 1, wherein said tap weight coefficients are respectively updated by corresponding error distances computed from all said candidate symbols.

6. The method according to claim 1, wherein said candidate symbols number two.

7. The method according to claim 1, wherein the predetermined number of received signals in a test period is determined based on an average time interval between one suspicious signal and a next suspicious signal.

8. A QPSK digital communication system for making soft decisions comprising:

a receiver for reproducing original signals from received signals;

decision means for producing error distances and decision values;

buffer means for storing said decision values produced from said decision means during a test period, said test period starting when one of said reproduced original signals is located in a boundary area of a signal space, said buffer means comprising a plurality of buffers, each buffer storing a series of decision values;

error distance sum computing means for accumulating error distances during said test period and for producing a selection signal to select one buffer of said buffers which corresponds to a least error distance sum; and controlling means for providing said error distances obtained from said decision means to said error distance sum computing means and said receiver during said test period;

wherein a series of decision values produced from said selected buffer by said selection signal are determined to be original message symbols for the signals received during said test period.

9. The system according to claim 8, further comprising switching means for preventing said error distances from being input to said error distance sum computing means and preventing said error distances from being input to said receiver when said test period has not started.

10. The system according to claim 8, wherein said controlling means determines that said test period should start by checking a phase of said reproduced original signal output from the receiver in the case of phase shift keying modulation and by checking a magnitude and phase of said reproduced original signal from the receiver in the case of quadrature amplitude modulation.

11. The system according to claim 8, wherein said receiver includes:
- a feedforward part to which said received signals are input;
- L feedbackward parts having front ends to which the decision values are input during said test period;
- L feedforward tap coefficient generating parts and L feedbackward tap coefficient generating parts which are updated based on said error distances during the test period to output feedforward and feedbackward tap coefficient vector values;
- L multipliers for generating inner products of output vector values of said feedforward part and said feedforward tap coefficient vector values;
- L multipliers for generating inner products of output vector values of said feedbackward parts and said feedbackward tap coefficient vector values; and
- L adders for adding respectively outputs of the multipliers.

12. The system according to claim 8, wherein said receiver includes:
- a set of delay taps to which said received signals are input;
- L delay tap coefficient generating parts which are updated by said error distances during said test period and which generate delay tap coefficient vector values;
- L multipliers for generating inner products of output vector values of said delay taps and said delay tap coefficient vector values; and
- L adders for adding outputs of the multipliers.

13. The system according to claim 8, wherein said decision means includes:
- L deciding means for deciding outputs of said receiver; and
- L subtractors for generating differences between outputs of said receiver and said decision values from said deciding means as error distance values.

14. The system according to claim 8, wherein said error distance sum computing means includes:
- L accumulators for accumulating each error distance produced from said decision means during said test period; and
- least value detecting means for producing a selection signal for selecting said buffer corresponding to said least error distance sum by comparing outputs from said accumulators.

* * * * *